(12) United States Patent
Fortin et al.

(10) Patent No.: US 8,433,871 B2
(45) Date of Patent: Apr. 30, 2013

(54) DATA COPY MANAGEMENT FOR FASTER READS

(75) Inventors: Michael R. Fortin, Redmond, WA (US);
Cenk Ergan, Bellevue, WA (US);
Mehmet Iyigun, Bellevue, WA (US);
Yevgeniy Bak, Redmond, WA (US);
Benjamin A. Mickle, Bellevue, WA (US); Alexander Kirshenbaum, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/413,073

(22) Filed: Mar. 6, 2012

(65) Prior Publication Data
US 2012/0166719 A1    Jun. 28, 2012

Related U.S. Application Data

(63) Continuation of application No. 12/025,710, filed on Feb. 4, 2008, now Pat. No. 8,151,068.

(51) Int. Cl.
*G06F 12/16* (2006.01)
(52) U.S. Cl.
USPC ............ 711/162; 711/112; 711/161; 714/6.1; 714/6.23
(58) Field of Classification Search .................. 711/112, 711/161, 162; 714/6.1, 6.23
See application file for complete search history.

(56) References Cited

U.S. PATENT DOCUMENTS

| | | | |
|---|---|---|---|
| 5,463,758 A | 10/1995 | Ottesen | |
| 5,557,770 A | 9/1996 | Bhide | |
| 5,574,882 A | 11/1996 | Menon | |
| 6,038,619 A | 3/2000 | Berning | |
| 6,282,041 B1 | 8/2001 | Blumenau | |
| 6,412,046 B1 | 6/2002 | Sharma | |
| 6,609,182 B1 | 8/2003 | Pedrizzetti et al. | |
| 6,721,845 B1 | 4/2004 | Clegg | |
| 7,146,467 B2 | 12/2006 | Bearden | |
| 8,151,068 B2 | 4/2012 | Fortin | |
| 2001/0047451 A1 | 11/2001 | Noble et al. | |
| 2002/0056010 A1 | 5/2002 | Lincoln et al. | |
| 2003/0041218 A1 | 2/2003 | Kataria | |
| 2003/0191916 A1 | 10/2003 | McBrearty et al. | |
| 2003/0221052 A1 | 11/2003 | Yechiel | |
| 2005/0204095 A1 | 9/2005 | Dayan | |
| 2006/0010299 A1 | 1/2006 | Zhang | |
| 2007/0233993 A1* | 10/2007 | Kato et al. | 711/170 |
| 2009/0198883 A1 | 8/2009 | Fortin | |

OTHER PUBLICATIONS

"Disk Subsystem Performance Analysis for Windows", http://download.microsoft.com/download/e/b/a/eba1050f-a31d-436b-9281-92cdfeae4b45/subsys_perf.doc, Microsoft Corp, (Mar. 2004), pp. 1-31.

(Continued)

*Primary Examiner* — Jae Yu
(74) *Attorney, Agent, or Firm* — Wolfe-SBMC

(57) ABSTRACT

Multiple copy sets of data are maintained on one or more storage devices. Each copy set includes at least some of the same data units as other sets. Different sets optionally have data units stored in different orders on the storage device(s). A particular one of the sets of data is selected as the set to be accessed in response to detecting a particular scenario.

23 Claims, 8 Drawing Sheets

OTHER PUBLICATIONS

"Final Office Action", U.S. Appl. No. 12/025,710, (Mar. 21, 2011), 10 pages.
"Non-Final Office Action", U.S. Appl. No. 12/025,710, (Oct. 5, 2010), 10 pages.
"Non-Final Office Action", U.S. Appl. No. 12/025,710, (Sep. 8, 2011), 11 pages.
"Notice of Allowance", U.S. Appl. No. 12/025,710, (Nov. 22, 2011), 7 pages.
"Restriction Requirement", U.S. Appl. No. 12/025,710, (Jun. 23, 2010), 7 pages.
Bitton, Dina et al., "Disk Shadowing", Retrieved from: <http://research.microsoft.com/~gray/papers/TandemTR88.5_DiskShadowing.pdf> on Jul. 19, 2007, (Jun. 1988), 15 pages.
Patterson, et al., "Informed Prefetching and Caching", *Proceedings of the Fifteenth ACM Symposium on Operating Systems Principles*: http://delivery.acm.org/10.1145/230000/224064/p79-patterson.pdf?key1=224064&key2=6159554811&coll=Portal&dl=GUIDE&CFID=2395334 5&CFTOKEN=39645750, (1995), pp. 79-95.

\* cited by examiner

DATA COPY MANAGEMENT FOR FASTER READS

RELATED APPLICATIONS

This application is a continuation of and claims priority to U.S. patent application Ser. No. 12/025,710, filed Feb. 4, 2008, the disclosure of which is incorporated in its entirety by reference herein.

BACKGROUND

Computer processor technology is rapidly advancing, resulting in continually increasing processor performance. The performance of such processors, however, is sometimes hindered by other bottlenecks in the computer. For example, the speed of data transfer from hard disk drives into RAM is a bottleneck in computer performance. Hard disk drives have the benefit of being able to read data randomly—the data does not need to be stored on the disk in sequential order for it to be read. However, such non-sequential reading is typically very slow, thereby exacerbating the bottleneck created by hard disk drives.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, multiple copy sets of data are maintained on a storage device. Each copy set includes at least some of the same data units as a master set. A particular one of the copy sets of data or the master set of data is selected as the set to be accessed in response to detecting a particular scenario.

In accordance with one or more aspects, multiple copy sets of data are created on a storage device. Each copy set has at least some identical data units as other copy sets, and each copy set has data units of the data for a particular scenario for reading the data. One of the multiple copy sets is selected to read from when reading the data from the storage device.

BRIEF DESCRIPTION OF THE DRAWINGS

The same numbers are used throughout the drawings to reference like features.

DETAILED DESCRIPTION

Data copy management for faster reads is discussed herein. Using the techniques discussed herein, multiple copy sets of data are maintained on a storage device(s), each copy set having data units for a particular scenario for reading the data. The data units included in a particular copy set are grouped together in close proximity on the storage device(s). When an application and/or operation accesses this data for a particular scenario, the particular copy set that has the data units for that particular scenario is accessed to retrieve the data. By having the data units for different scenarios in different copy sets, the data can be retrieved for these different scenarios faster than if the data were more dispersed across the storage device. Layout of the data in each copy set as sequential or semi-ordered can provide additional performance improvements during reading.

Figure 1:
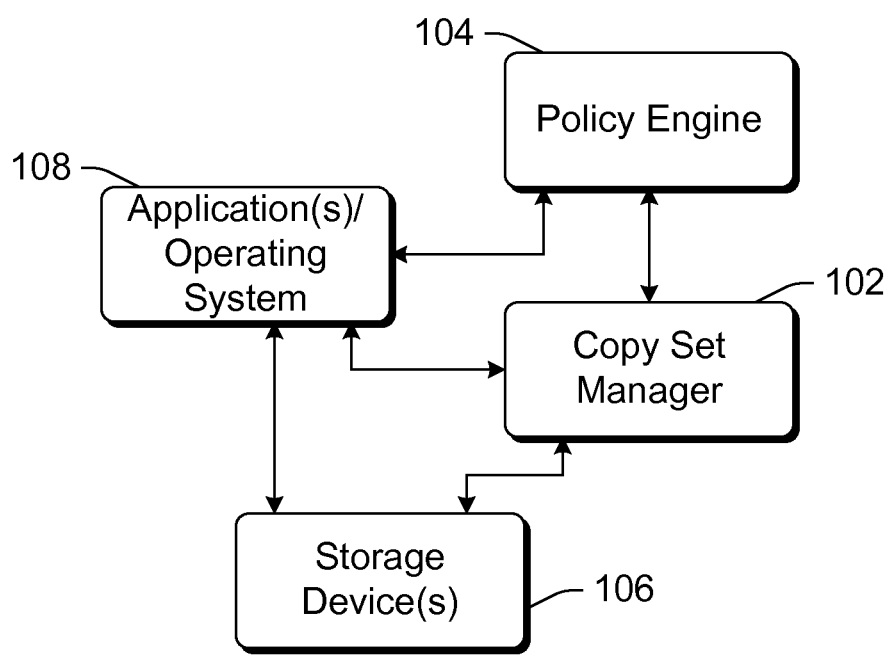
FIG. 1 illustrates an example system employing data copy management for faster reads in accordance with one or more embodiments.

FIG. 1 illustrates an example system 100 employing data copy management for faster reads in accordance with one or more embodiments. System 100 includes a copy set manager 102, a policy engine 104, one or more storage devices 106, and one or more applications and/or operating system 108. Storage devices 106 can be any of a variety of storage devices, such as flash memory devices, magnetic disk drive devices, optical disk drive devices, and so forth.

Generally, different applications and/or operations (such as operations carried out by an operating system) 108 read data from storage device 106. This data includes various instructions, parameters, inputs, and so forth for a desired operation to be carried out and/or a desired application to be executed. At least some of the same data is oftentimes read in different scenarios, although some data can also be read in particular scenarios that is not read in other scenarios. Additionally, in situations where the same data is read in different scenarios, different scenarios frequently read the data in different orders.

A scenario refers to data being read for a particular purpose. Examples of different scenarios include launching a new application, booting the system, recovering from a standby mode or hibernation mode, invoking an operation of an application or operating system (e.g., accessing a control panel, accessing a start menu, accessing a printer selection dialog window, etc.), switching between different users, and so forth. As a specific example of different scenarios, a first scenario could be launching an application that involves reading a particular group of instructions and parameters from the storage device. A second scenario could be recovering that application from the storage device when the system exits a hibernation mode, and can involve reading at least some of the same group of instructions and/or parameters as in the first scenario. The order in which that same group of instructions and/or parameters are read from the storage device in the two scenarios, however, can be different. Additionally, some data may be read in one of the two scenarios that is not read in the other of the two scenarios.

Grouping data to be read from storage device 106 for a particular scenario together in close proximity is oftentimes beneficial because it reduces seek time. Seek time refers to the time needed by many storage devices, such as hard disk drives, to position a read mechanism (e.g., a read head) and the storage media for particular data to be read. By reducing the amount of seek time and/or the number of seeks that are performed, faster data transfer rates can typically be achieved. Grouping data to be read from storage device 106 for a particular scenario together in close proximity can also be beneficial because it can allow read-ahead and other caching (e.g., as done by the system in software or by the storage device), can allow for larger and fewer inputs/outputs (I/Os) which provide better throughput and lower overhead (e.g., lower I/O setup costs), and/or can allow the copy sets to be positioned in faster areas of the storage device.

However, the different scenarios reading different data and/or reading the data in different orders makes it difficult to group the data in storage device 106 together for each of the different scenarios. Data that is grouped together for one scenario may not be (and oftentimes is not) grouped together for another scenario.

Copy set manager 102 overcomes these difficulties by managing one or more copy sets of data on one or more storage devices 106. Each copy set refers to a collection of data that is requested in a particular scenario by an application and/or operation. Copy set manager 102 maintains a different copy set for multiple ones of these different scenarios. The copy set for each scenario has the data that is read in that scenario grouped together in close proximity on a storage device 106 rather than dispersed widely across storage device 106. This grouping of the data allows storage device 106 to reduce the number of seeks performed in reading the data from storage device 106, thereby resulting in faster reading of the data. Each of these copy sets is a copy of at least some of the data in an original or master set of the data.

In one or more embodiments, the copy set for each scenario also optionally has the data that is read in that scenario organized on a storage device 106 in an order that is the same, or approximately the same, as the order in which the data is read. This ordering of the data in the copy set allows storage device 106 to retrieve the data using sequential reads rather than random reads, which can further increase the speed at which data can be read from storage device 106.

Figure 2:
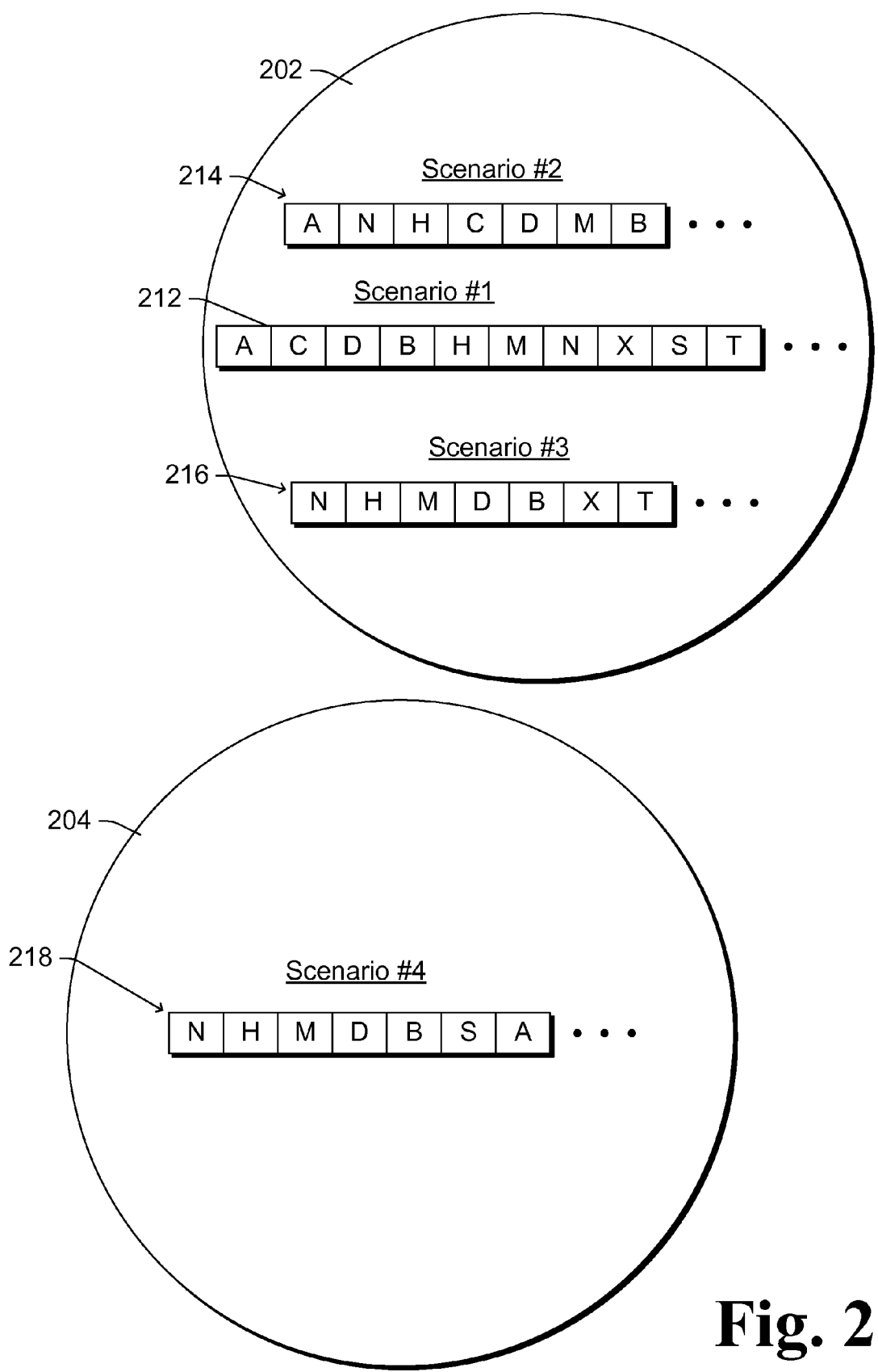
FIG. 2 illustrates example copy sets for multiple scenarios in accordance with one or more embodiments.

FIG. 2 illustrates example copy sets for multiple scenarios in accordance with one or more embodiments. In FIG. 2, two storage devices 202 and 204 are illustrated. An original or master set of data 212 and two copy sets 214 and 216 are stored on storage device 202, and one copy set 218 is stored on storage device 204. Each of the sets 212-218 includes multiple data units, labeled as letters in FIG. 2. A data unit refers to the smallest amount of data that is managed or tracked by the data copy management for faster reads discussed herein. A data unit can be, for example, a data block which refers to the granularity of access to data stored on device 106 (the smallest amount of data on storage device 106 that can be accessed at a time). Oftentimes a data block is 4 kilobytes, although different sized data blocks can alternatively be used. In the example of a disk drive, these data blocks are also referred to as disk blocks. A data unit can alternatively be other sizes, such as a memory page or disk page (which may or may not be the same size as a disk block), a unit of data used by a file system of the storage device (e.g., typically a cluster), or any other size desired by a designer, administrator, and/or other user of the data copy management for faster reads discussed herein.

For data units that are included in each copy set, the data units can be arranged in the same order in the different copy sets or alternatively in different orders. In one or more embodiments, the data units in the order that they were originally stored on disk (optionally as rearranged by the operating system in defragmentation or alternatively other processes) are also referred to as the original or master set. Subsequent sets can also be referred to as copy sets, and are generated as discussed below. In such embodiments the master set can also be viewed as simply another copy set, so that references herein to copy sets include the master set.

As illustrated in FIG. 2, different copy sets can be maintained on different storage devices. Although only two storage devices are illustrated in FIG. 2, alternatively copy sets could be spread across three or more storage devices. Additionally, in other alternatives all of the copy sets can be stored on the same storage device.

In one or more embodiments, the order of the data units illustrated in FIG. 2 is the order the data units are stored on the storage device. For example, in copy set 212, data unit A is first, which is followed by data unit C, which is followed by data units D, which is followed by data unit B, etc. In one or more embodiments this ordering is due to the reading of the data units in the first scenario being expected to occur in the order of data unit A, data unit C, data unit D, data unit B, etc.

Different copy sets can include the same data units or alternatively different data units. For example, some of the copy sets (e.g., copy sets 212 and 214) include the same data units but have the data units stored in a different order. Additionally, some of the copy sets include data units that are not in others (e.g., copy set 218 includes several data units N, H, M, D and B that are the same as in copy set 216 and are in the same order as in copy set 216, but also includes data units S and A that are not included in copy set 216).

The different sets 212-218 include at least some of the same data units. For example, each set includes data unit M and data unit B, although in different orders. These same data units are identical to one another—the same data units in different sets differ from one another in their location, but the data stored in the units is the same.

Returning to FIG. 1, copy set manager 102 maintains a copy set map that identifies where in the storage device(s) 106 the copy sets are stored. This copy set map may also identify where the master set is stored. Copy set manager 102 typically keeps track of sets only if there are multiple sets of the data. If there is only one set of the data on the storage device(s) 106, then there are not multiple sets that could be read from and copy set manager 102 does not need to keep track of this single set.

Figure 3:
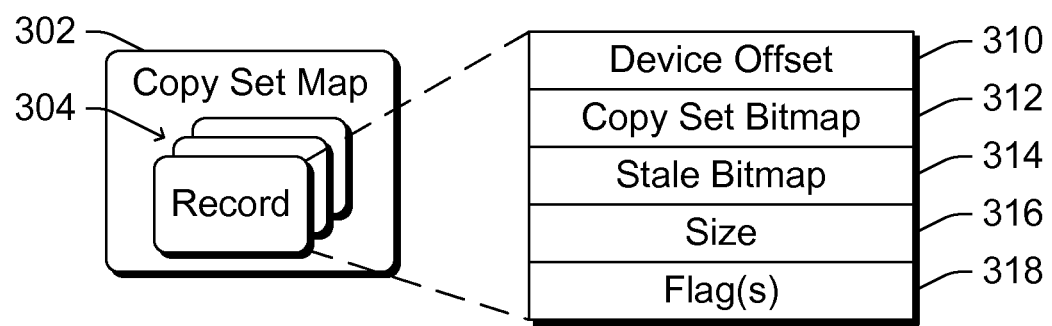
FIG. 3 illustrates an example copy set map in accordance with one or more embodiments.

FIG. 3 illustrates an example copy set map in accordance with one or more embodiments. For each copy set, copy set map 302 maintains a corresponding record 304 identifying where that copy set is stored on a storage device(s). Copy set map 302 may also optionally keep a record 304 identifying where the master set(s) is stored on the storage device(s). Each record 304 includes a device offset field 310, a copy set bitmap field 312, a stale bitmap field 314, a size field 316, and one or more flag fields 318. In situations where copy sets can be stored on different storage devices, a different copy set map can be maintained for each storage device. Alternatively, an additional field storing an identifier of the storage device on which the copy set is stored can be included in each record 304.

Device offset field 310 stores an identifier of an offset into the particular storage device where storage of the data for the corresponding copy set begins. Size field 316 stores an identifier of the size of the corresponding copy set. This size can be stored in different units, such as data units, kilobytes, etc.

Copy set bitmap field 312 stores a copy set bitmap for the corresponding copy set. This copy set bitmap includes a bit corresponding to each data unit of the copy set. These bits can be used to identify which scenario is being used and thus which copy set is to be activated and used. It should be noted that in situations where copy sets are activated based purely on notification by another component, and automatic identification of which copy set to activate is not being performed, then copy set bitmaps need not be used. This copy set bitmap and its use are discussed in more detail below.

Stale bitmap field 314 stores a stale bitmap for the corresponding copy set. This stale bitmap includes a bit corresponding to each data unit of the copy set. These bits can be used to identify when a particular data unit has become stale due to the data in a corresponding data unit of another copy set being modified. This stale bitmap and its use are discussed in more detail below.

Flag field(s) 318 store various state information regarding the corresponding copy set. Examples of such flags include a flag indicating that the corresponding copy set is not available because it includes stale data, a flag indicating that the corresponding copy set is not available because it has not yet been verified against the master, a flag indicating that an update to the copy set is currently in progress (e.g., one or more data units of the copy set are being modified, added, and/or removed), and so forth.

Copy set map 302 is used to identify the various copy sets. This identification can take different forms. In one or more embodiments, copy set map 302 maintains a data structure, such as a B-tree, that maps I/O (input/output) ranges to particular copy sets. Thus, when an I/O access is received by copy set manager 102, copy set manager 102 can identify which copy sets have the data location accessed by that I/O access.

Additionally, in one or more embodiments each copy set also includes a copy set descriptor that describes that copy set. The copy set descriptor can be stored with the copy set, or alternatively can be stored separately (e.g., as a separate map similar to copy set map 302). In one or more embodiments, each copy set is stored as a file on the storage device, and the copy set descriptor is included as part of that file.

Figure 4:
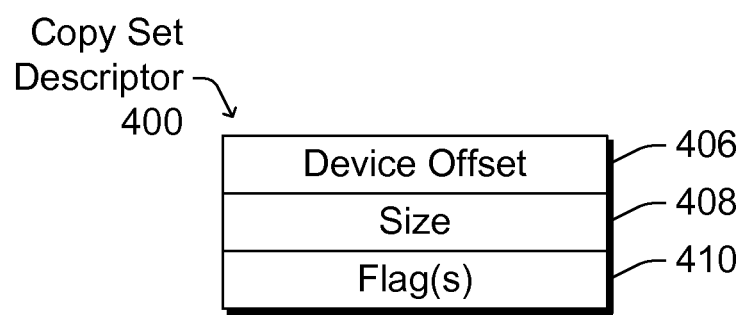
FIG. 4 illustrates an example copy set descriptor in accordance with one or more embodiments.

FIG. 4 illustrates an example copy set descriptor 400 in accordance with one or more embodiments. Copy set descriptor 400 includes a device offset field 406, a size field 408, and one or more flag fields 410.

Device offset field 406 stores an identifier of an offset into the particular storage device where storage of the data for the corresponding copy set begins, analogous to device offset field 310 of FIG. 3. Size field 408 stores an identifier of the size of the corresponding compressed data unit, analogous to size field 316 of FIG. 3. Flag field(s) 410 store various state information regarding the corresponding copy set. Examples of such flags include a flag indicating that the copy set is not available because it includes stale data, a flag indicating that the copy set is not available because it has not yet been verified against the master, a flag indicating that an update to the copy set is currently in progress, a flag indicating that the copy set is an in-memory buffer, and so forth.

Returning to FIG. 1, copy set manager 102 manages the copy sets stored on storage device(s) 106. This management includes, for example, creating copy sets, deleting copy sets, updating copy sets, activating copy sets, and so forth.

Figure 5:
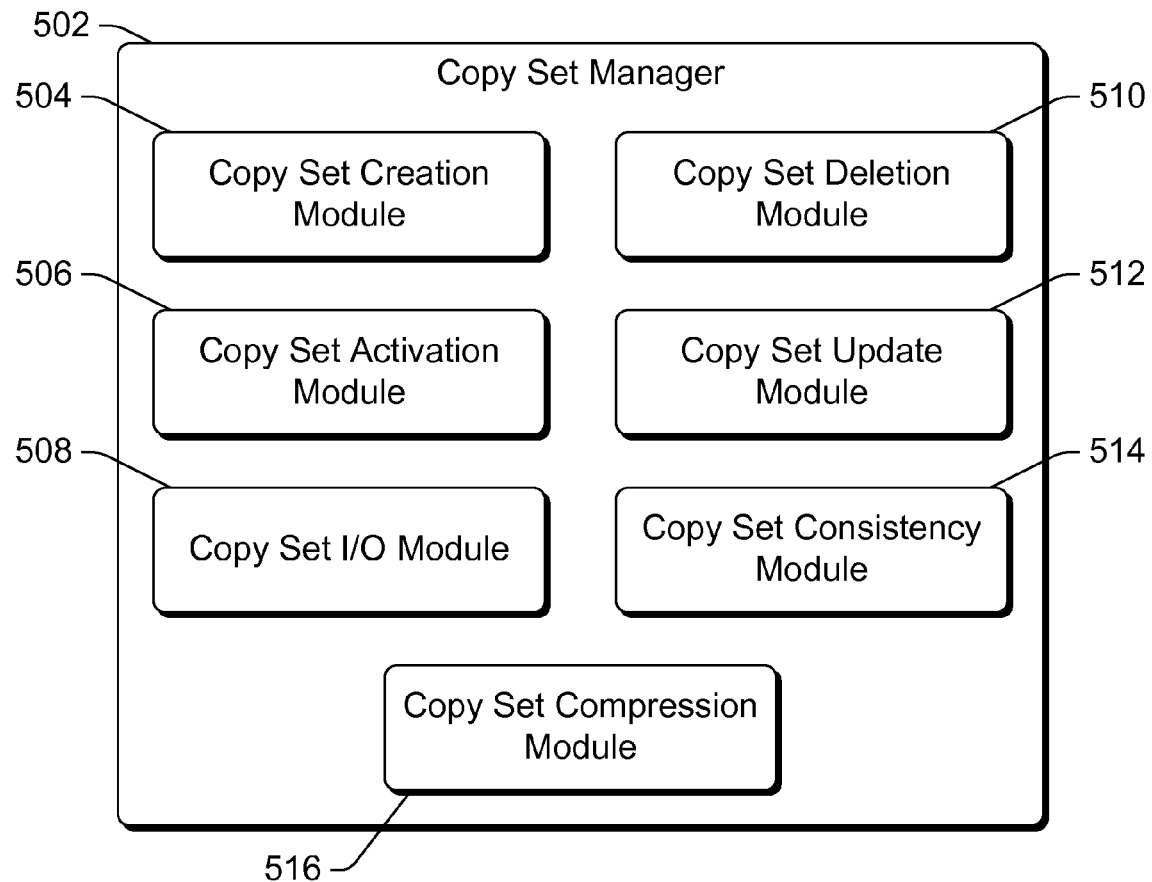
FIG. 5 is a block diagram illustrating an example copy set manager in accordance with one or more embodiments.

FIG. 5 is a block diagram illustrating an example copy set manager 502. Copy set manager 502 can be, for example, copy set manager 102 of FIG. 1. Copy set manager 502 includes a copy set creation module 504, a copy set activation module 506, a copy set I/O module 508, a copy set deletion module 510, a copy set update module 512, a copy set consistency module 514, and a copy set compression module 516.

Copy set creation module 504 controls the generation of new copy sets and their storage on the storage device(s). Copy set activation module 506 controls the selection of which of multiple copy sets is a currently active copy set. Copy set I/O module 508 controls the I/O accesses to the copy sets. Copy set deletion module 510 controls the deletion of copy sets from the storage device. Copy set update module 512 controls the updating of copy sets when corresponding data units from another copy set are modified. Copy set consistency module 514 maintains consistency among corresponding data units in different copy sets. Copy set compression module 516 compresses and decompresses data units in copy sets. The operation of these modules 504-516 is discussed in more detail below.

Copy set manager 502 can also perform various other management tasks. For example, if a particular storage device 106 or portion of a storage device 106 is faster than another device 106 or portion of the device 106, then the more important scenario(s) can be identified and the copy set(s) for those scenarios moved to the faster device 106 or faster portion of the device 106. The more important scenario(s) can be identified in different manners, such as by notification from a system administrator or other user, notification from another component such as an operating system, automatically determined based on frequency (e.g., more commonly occurring scenarios are more important), and so forth.

Copy set manager 502 can create copy sets in different manners. In one or more embodiments, a system administrator or other user selects the different copy sets for each scenario and optionally the order of data units in those copy sets. Copy set manager 502 is notified of this information, and in turn creates the identified copy sets. This creation includes storing the identified copy set, optionally with data units in the identified order, on the storage device.

Alternatively, or in addition to being notified of copy sets, copy sets to be created can be automatically identified based on the operation of system 100. Policy engine 104 of FIG. 1 monitors the I/O accesses in system 100 and, based on these I/O accesses, automatically identifies when new copy sets are to be created and the ordering of data units for those copy sets. Alternatively, this determination can be made by copy set manager 102 rather than policy engine 104.

Figure 6:
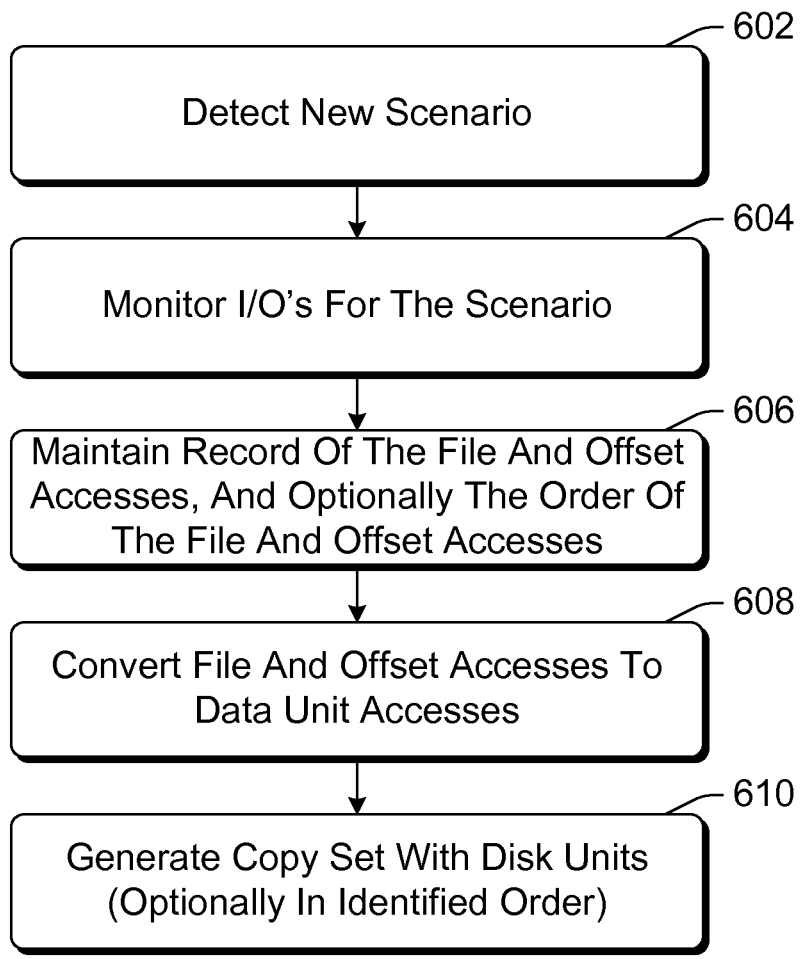
FIG. 6 is a flowchart illustrating an example process for automatically generating a copy set in accordance with one or more embodiments.

FIG. 6 is a flowchart illustrating an example process 600 for automatically generating a copy set in accordance with one or more embodiments. Process 600 is carried out by a copy set manager, such as copy set manager 102 of FIG. 1 (or copy set creation module 504 of FIG. 5), optionally with the assistance of a policy engine, such as policy engine 104 of FIG. 1. Process 600 can be implemented in software, firmware, hardware, or combinations thereof Initially, a particular new scenario is detected (act 602). This new scenario is a different scenario than any scenario for which a copy set has already been created. For example, if a copy set for launching a particular application already exists, then launching of that particular application is not detected as a new scenario. However, if a copy set for recovering that application when the system exits from a hibernate mode has not been created, then recovery of the application from hibernation would be detected as a new scenario. Additionally, launching a different application for which a copy set has not been created would also be detected as a new scenario.

The new scenario can be detected in act 602 in different manners. In one or more embodiments, a notification of the scenario is received (e.g., from the operating system). Alternatively, the policy engine and/or copy set manager can automatically detect the new scenario. For example, I/O accesses can be monitored and a record of the I/O accesses maintained. This record can be analyzed to determine whether a copy set that includes those I/O access, optionally arranged in the same order as the monitored I/O accesses, exists. If no such copy set exists, then these monitored I/O accesses can be treated as a new scenario.

I/O accesses for the scenario are then monitored (act 604), and a record of the particular I/O accesses is maintained (act 606). These I/O accesses typically identify particular data to read based on a file identifier and an offset into that file. These file identifier and offset combinations are monitored and a record of the file identifier and offset combinations is maintained in act 606. In one or more embodiments, the order of the particular file and offset accesses is also maintained in act 606.

When the scenario ends, the file and offset accesses are converted to data unit accesses (act 608). The end of the scenario can be detected in different manners. In one or more embodiments, a notification of the end of the scenario is received (e.g., from the operating system). Alternatively, the policy engine and/or copy set manager can automatically detect the end of the scenario. For example, I/O accesses can be monitored and the end of the scenario can be detected as being when longer than a threshold amount of time occurs without an I/O access.

Copy set manager knows, or has access to, the information mapping the file identifiers and offsets to data units. This information can be obtained, for example, from the file system implemented by the operating system.

Alternatively, rather than maintaining a record of the file identifiers and offsets and then converting those to data units, the data unit accesses themselves can be monitored and a record of the data unit accesses maintained in act 606. In such situations, no conversion in act 608 need be performed.

Given the data unit accesses for the new scenario, a copy set with the data units identified in act 604 is generated (act 610). This generated copy set is stored on a storage device in the system, and a record of this copy set is maintained as discussed above. This newly generated copy has the data units accessed for this scenario stored in close proximity on the storage device, so the next time this scenario is encountered the data units can be read from the storage device with fewer seeks than if the data units were spread more widely across the storage device. In one or more embodiments, the copy set also has the data units arranged in the order in which they were identified in act 604.

Returning to FIG. 1, copy set manager 102 also activates copy sets. Activating a copy set refers to selecting which of the multiple copy sets the read accesses are to be satisfied from. This copy set from which the accesses are to be satisfied from is also referred to as the active copy set or currently active copy set. Copy set manager 102 can activate copy sets in different manners. In one or more embodiments, another component in the system, such as the operating system, notifies copy set manager 102 of the particular copy set to activate.

Alternatively, or in addition to being notified of which copy sets to activate, copy sets to be activated can be automatically identified based on the operation of system 100. Policy engine 104 monitors the I/O accesses in system 100 and, based on these I/O accesses, automatically identifies which copy sets are to be activated. Alternatively, this determination can be made by copy set manager 102 rather than policy engine 104.

Figure 7:
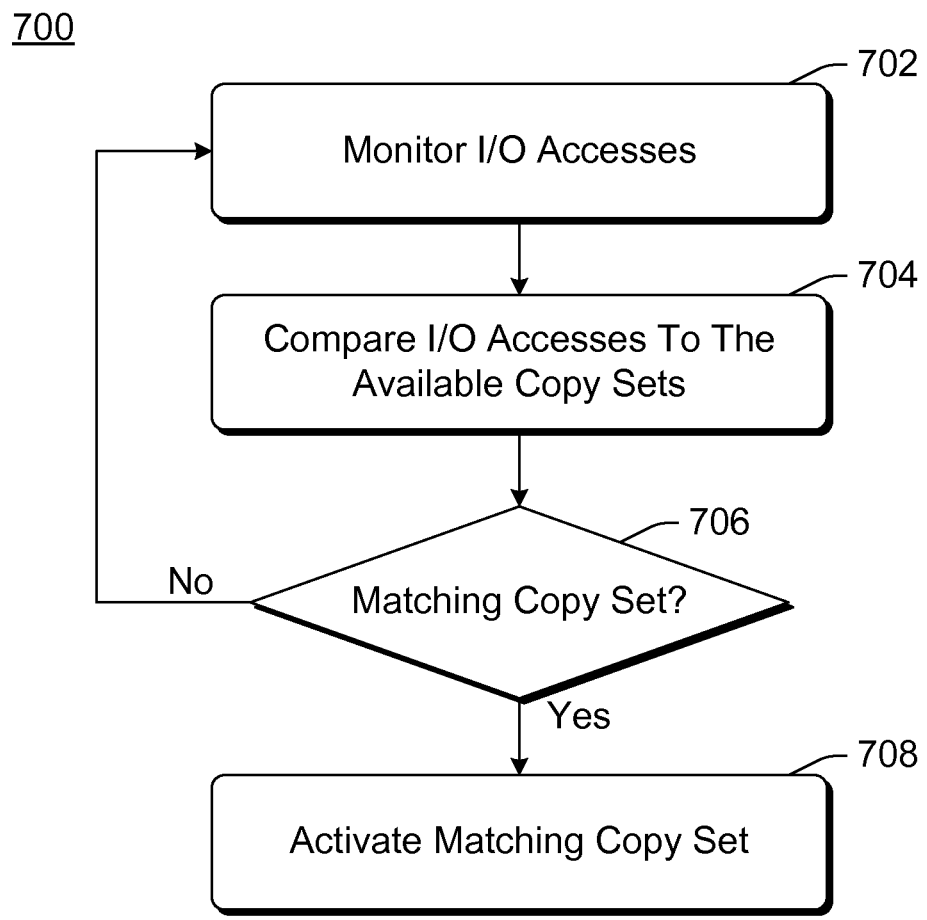
FIG. 7 is a flowchart illustrating an example process for activating a copy set in accordance with one or more embodiments.

FIG. 7 is a flowchart illustrating an example process 700 for activating a copy set in accordance with one or more embodiments. Process 700 is carried out by a copy set manager, such as copy set manager 102 of FIG. 1 (or copy set activation module 506 of FIG. 5), optionally with the assistance of a policy engine, such as policy engine 104 of FIG. 1. Process 700 can be implemented in software, firmware, hardware, or combinations thereof.

Initially, I/O accesses are monitored (act 702). The I/O accesses can be monitored by file identifier and offset and converted to data units, or alternatively the I/O accesses can be monitored by the data unit accesses themselves. The data units accessed are then compared to the available copy sets (act 704). This comparison includes keeping track of which data units are accessed. Such information can be kept track of in different manners. In one or more embodiments, for each data unit accessed, the bit in the copy set bitmap (e.g., bitmap field 312 of FIG. 3) that corresponds to that data unit is set (e.g., set to a value of 1). This bit is set in the copy set bitmap corresponding to each copy set that includes that data unit.

A check is then made as to whether there is a copy set that matches the monitored I/O accesses (act 706). A copy set matches the monitored I/O accesses when, for example, greater than a threshold number of bits in its copy set bitmap have been set. This threshold number can be a fixed value (e.g., 100 bits), or a dynamic value (e.g., 20% of the bits). This matching can also involve analyzing whether the bits that are set in a particular copy set bitmap are weighted towards the beginning of that copy set, with the copy set having more bits towards the beginning of the copy set bitmap set being selected. For example, if the bits that are set in a first copy set bitmap are predominately at the beginning of the first copy set bitmap, and the bits that are set in the second copy set bitmap are scattered throughout the second copy set bitmap, then the copy set corresponding to the first copy set bitmap is determined to be the closer match (and is selected as the matching copy set in act 706).

If multiple copy sets match the monitored I/O accesses, then a closest matching copy set is selected as the matching copy set in act 706. The closest matching copy set can be identified in different manners, such as the copy set having the greatest number of bits in its copy set bitmap having been set, the copy set with bits in its copy set bitmap that are set being weighted towards the beginning of the copy set bitmap, and so forth.

If there are no matching copy sets, then process 700 continues to monitor and compare the I/O accesses in acts 702 and 704. However, if there is a matching copy set, then the matching copy set is activated (act 708).

In one or more embodiments, the I/O accesses are satisfied from an initial set while being monitored and compared in acts 702 and 704. This initial set can be selected in different manners, such as being the original or master set, a randomly selected copy set, the most recently activated set, and so forth. Once a matching copy set is identified and activated, the I/O accesses are satisfied by the activated copy set rather than this initial set. If no matching copy set is identified in act 706, then the I/O accesses are satisfied by the initial set. Alternatively, the I/O accesses can be received and held until a copy set is activated in act 708. Once a copy set is activated, all of the I/O accesses that were held are satisfied using the activated copy set.

It should be noted that, in act 704, the I/O accesses are compared to the available copy sets. In certain situations, a particular copy set may be present on a storage device but not available. Such situations can arise, for example, when the data in a particular one or more data units of the copy set is stale (e.g., as indicated by stale bitmap field 314 of FIG. 3), as discussed in more detail below.

It should also be noted that situations can arise where an I/O access cannot be satisfied by the activated copy set. In such situations, the proper location(s) of the storage device(s) is accessed to satisfy the I/O access.

Typically, the copy set activated in act 706 remains activated until the scenario ends. The ending of the scenario can be determined by receiving notification of the end or by automatically detecting the end, as discussed above. When the scenario ends, the bits in the various copy set bitmaps corresponding to the copy sets stored on the storage device(s) are cleared (e.g., changed to a value of 0) to get ready to automatically detect the next copy set to activate for the next scenario.

Alternatively, once a copy set is activated, the I/O access may continue to be monitored to ensure that greater than a threshold number of I/O accesses are satisfied by the activated copy set. If the number of I/O accesses that are satisfied by the copy set falls below this threshold number, then the activated copy set can be de-activated. Once de-activated, another copy set is activated. This other copy set could be another matching copy set (e.g., analogous to the discussion above in act 706), or alternatively could be a default copy set (e.g., the master or original set, or the initial set discussed above).

Returning to FIG. 1, copy set manager 102 can retrieve data units from data sets in a variety of different manners. In one or more embodiments, the data units in the copy set are read from the storage device and buffered in memory to satisfy the I/O accesses. If there is insufficient memory to buffer all of the copy set, then copy set manager 102 reads ahead in anticipation of the data unit accesses, removing from the buffer data for which I/O accesses have already been satisfied. How far to read ahead and the size of the buffer can vary depending on available memory in the system, the speed of the disk, and/or the speed of the processor in the system.

Additionally, in one or more embodiments the I/O accesses may be received essentially randomly and not in the order in which the data units are stored in the copy set. In such situations, multiple I/O accesses are held until at least a threshold number has been received, or until a threshold amount of time passes without receiving any I/O accesses (indicating that the I/O accesses have stopped, at least temporarily). The data units corresponding to the multiple I/O accesses can then be retrieved, typically in the order in which they occur in the copy set. Alternatively, rather than holding the multiple I/O accesses, the multiple I/O accesses can be satisfied as they are received.

It should also be noted that the specific access strategy for different scenarios, when known, can be incorporated into copy set manager 102. For example, some I/O accesses can be synchronous, in which case the issuer of the I/O accesses waits until it receives a response to one I/O access before issuing a second I/O access. Other I/O accesses, on the other hand, can be asynchronous, in which case the issuer of the I/O accesses issues multiple I/O accesses without waiting for previous I/O accesses to be satisfied. If it is known that a particular scenario involves a series of synchronous I/O accesses followed by a series of asynchronous I/O accesses, then copy set manager 102 can retrieve the data units anticipated for the synchronous I/O accesses from the storage device and buffer those in memory until the asynchronous I/O accesses begin. Once the asynchronous I/O accesses begin, then copy set manager 102 can hold the I/O accesses until at least a threshold number have been received (or until a threshold amount of time without an access has passed), and then read the appropriate data units for the I/O accesses from the storage device.

Copy set manager 102 also deletes copy sets. The deletion can be controlled, for example, by copy set deletion module 510 of FIG. 5. Situations can arise where the available space on storage device 106 becomes too low, and in response to such situations copy set manager 102 can delete one or more copy sets so that the available space is no longer too low. The situation can be detected, for example, by monitoring the available space on the storage device and determining that the available space is too low if it drops below a threshold amount. This threshold amount can be a fixed value (e.g., 5 gigabytes), or a dynamic value (e.g., 10% of the overall storage capacity of the storage device).

If a copy set is to be deleted, copy set manager 102 can determine which of multiple copy sets to delete in a variety of different manners. For example, the least frequently used copy set could be deleted, the largest copy set could be deleted, a copy set can be selected randomly, and so forth. Additionally, if it is determined that one or more copy sets are to be deleted, then copy set creation is optionally postponed until the available storage space becomes greater.

Copy set manager 102 also controls the updating of copy sets when corresponding data units from another copy set are modified. The updating can be controlled, for example, by copy set update module 512 of FIG. 5. Situations can arise where data in a particular data unit is modified (e.g., the data in that data unit is changed due to a write I/O access). If copies of this modified data unit exist in multiple copy sets, then which one of those data units is modified or updated can be determined in different manners. For example, the data unit in a master set can be updated, the data unit that was in the activated copy set when the data was read can be updated, one of the copy sets can be selected randomly, and so forth.

Additionally, if copies of this updated data unit exist in other copy sets, then those data units in the other copy sets have become stale as they no longer contain valid data. These data units in the other copy sets are also referred to as the corresponding data units from another (other) copy set(s). These corresponding data units in other copy sets are marked as stale, such as by marking the bits corresponding to the data units in the stale bitmap field 314 of the record of the corresponding copy set. For example, if data unit B in copy set 216 of FIG. 2 were to be modified, then data unit B in each of sets 212, 214, and 218 would be marked as stale.

Marking of the corresponding data units as stale ensures that copy set manager 102 will not return those data units in response to an I/O access. Copy set manager 102 can subsequently update those data units so that they are no longer stale, and then can be returned in response to an I/O access.

Copy set manager 102 can handle stale data units in a variety of different manners. In one or more embodiments, any set having a stale data unit is considered as unavailable, and the set is not used. Alternatively, the non-stale data units can be retrieved, and any stale data units can be retrieved from another set in which they are not stale.

Copy set manager 102 also updates the stale data units so that they are no longer stale. Once updated, the stale bitmap of the corresponding copy set record is updated to reflect that the data unit is no longer stale. The stale data units are updated by copying the new data unit (the corresponding data unit from any copy set that is not stale) into the stale data unit. Additionally, in one or more embodiments a check is made as to how many of the data units in a copy set are stale. If greater than a threshold number of data units are stale, then the copy set can optionally be recreated or alternatively deleted.

Copy set manager 102 also maintains consistency among corresponding data units in different sets. Consistency can be maintained, for example, by copy set consistency module 514 of FIG. 5. Situations can arise where the contents of storage device 106 are altered in an environment where copy set manager 102 is not operating. Such situations can arise, for example, if storage device 106 is used in another system that does not support the copy sets discussed herein or does not have an operating copy set manager, or in situations where system 100 is booted into a different operating system that does not support copy sets or does not use a copy set manager. In such situations, data units in the master or original set could be modified without copy set manager 102 knowing, so manager 102 would not have updated the copy sets.

Copy set manager 102 can maintain consistency in a variety of different manners. In one or more embodiments, copy set manager 102 verifies each copy set before it is made available for satisfying I/O accesses. This verification can be accomplished in any of a variety of manners, such as by comparing the data units in the copy set to the data units in the master or original set. This verification ensures that any alterations to the copy set that occur where copy set manager 102 is not operating are detected. If the verification process identifies a change, then the data unit can be updated (e.g., the corresponding data unit of the master set can be copied into the changed data unit), or alternatively other courses of action can be taken (such as deleting the copy set).

In one or more other embodiments, copy set manager 102 makes use of a spin-up counter that is incremented very time the storage device 106 is powered on. Copy set manager 102 can maintain a record of the current spin-up counter value, and knows what it should be incremented to the next time manager 102 begins operation. If the spin-up counter does not have the expected value, then copy set manager 102 concludes that the storage device contents may have been changed. In response to this conclusion, a verification process as discussed above can be performed to determine if the storage device contents were changed, or alternatively other actions can be taken (e.g., the copy sets can be deleted).

In one or more other embodiments, other mechanisms supported by system 100 can be leveraged for determining whether the storage device contents may have been changed without the knowledge of copy set manager 102. For example, if the storage device has a write logging mechanism for managing writes, this mechanism could be leveraged to determine if the storage device contents may have been changed. For example, similar to the spin-up counter, a write counter could be used that is incremented every time the storage device is written to. If the write counter does not have the expected value, then copy set manager 102 concludes that the storage device contents may have been changed. In response to determining that the storage device contents may have been changed, a verification process as discussed above can be performed to determine if the storage device contents were changed, or alternatively other actions can be taken (e.g., the copy sets can be deleted).

In one or more other embodiments, no such verification may be performed. Rather, it may be assumed that the storage device contents are not altered without the knowledge of copy set manager 102. The user of system 100 may optionally be notified of this restriction, and notified that data integrity cannot be ensured if the storage device is used outside of a particular operating system and/or system 100.

Copy set manager 102 also optionally compresses and decompresses data units. The compression and decompression is performed, for example, by copy set compression module 516 of FIG. 5. Copy set manager 102 can use one or more of any of a variety of different compression algorithms, including publicly available compression algorithms and/or proprietary compression algorithms. The compression algorithm(s) used by copy set manager 102 is typically a lossless compression algorithm, although in certain circumstances (e.g., for certain image and/or audio data) a lossy compression algorithm can alternatively be used.

Compression can be implemented at a variety of different granularities. For example, each page of data or each data unit could be compressed individually. The compressed data is then stored on the storage device, and decompressed when read from the storage device. By way of another example, multiple pages or data units could be compressed together.

When compression is used, copy set manager 102 maintains an array or other record mapping the data units of the copy sets to physical compressed data. This allows the other modules of copy set manager 102 to operate on the copy sets using an uncompressed view of the copy set, and then map requested data units to the appropriate physical compressed data for I/O accesses.

It should be noted that, when using compression, situations can arise where a data unit is updated and the compressed updated data unit is larger than the previous compressed version of the data unit. In such situations, it may not be possible to simply overwrite the old compressed data unit in the copy set with the new compressed data unit. These situations can be resolved in different manners, such as by moving the new compressed data unit to a different location in the copy set, recreating the copy set, and so forth.

In addition, copy set manager 102 can optionally expose a user interface to allow a user of system 100 to see, and optionally manipulate, the actions being performed by copy set manager 102. Such a user interface could allow the user to see the layouts of the different copy sets, to be notified when a new copy set has been generated, to select a particular copy set as a default for activation, to see which copy sets currently include stale data units, and so forth. Such a user interface could also display various other information, such as the threshold values discussed above, to the user and allow the user to alter those threshold values.

Figure 8:
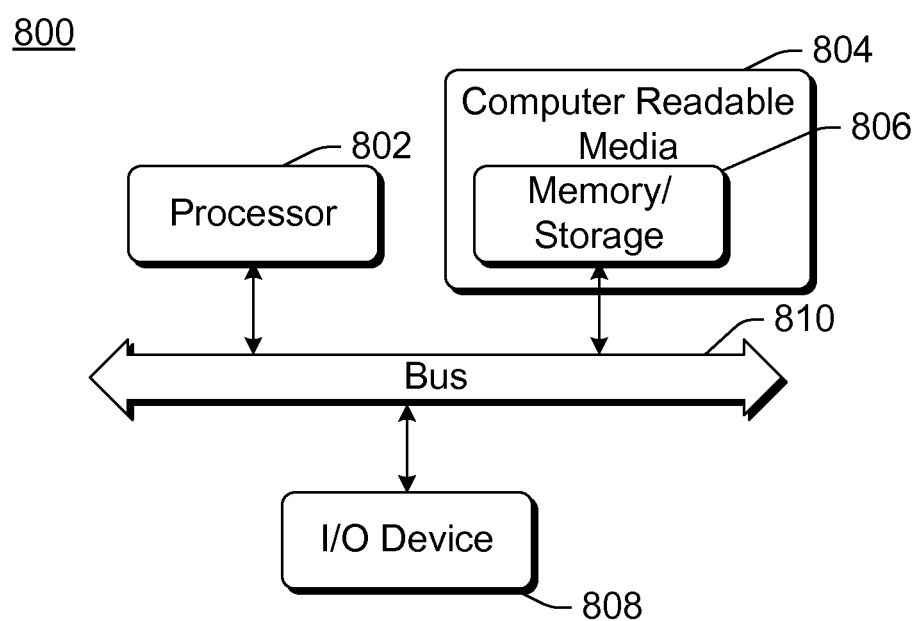
FIG. 8 illustrates an example computing device that can be configured to implement the data copy management for faster reads in accordance with one or more embodiments.

FIG. 8 illustrates an example computing device 800 that can be configured to implement the data copy management for faster reads in accordance with one or more embodiments. Computing device 800 can be, for example, system 100 of FIG. 1, or can implement any of the techniques and processes discussed herein.

Computing device 800 includes one or more processors or processing units 802, one or more computer readable media 804 which can include one or more memory and/or storage components 806, one or more input/output (I/O) devices 808, and a bus 810 that allows the various components and devices to communicate with one another. Computer readable media 804 and/or I/O device(s) 808 can be included as part of, or alternatively may be coupled to, computing device 800. Bus 810 represents one or more of any of several types of bus structures, including a memory bus or memory controller, a peripheral bus, an accelerated graphics port, and a processor or local bus using any of a variety of bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 802. It is to be appreciated that different instructions can be stored in different components of computing device 800, such as in a processing unit 502, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
a processor; one or more computer readable storage media, coupled to the processor, storing multiple modules for execution by the processor, the multiple modules including:
a copy set activation module that selects which of multiple copy sets stored on the one or more computer readable storage media to access, each copy set comprising a grouping of data units configured to provide data in response to a particular scenario, at least some of the data units in each copy set also included in a master set;
a copy set creation module that generates new copy sets to be added to the multiple copy sets, each new copy set having at least some of the same data units as other copy sets of the multiple copy sets; and
a copy set update module that controls updating of the multiple copy sets when one or more data units in at least one of the multiple copy sets or in the master set is modified, wherein the size of at least some of the data units is selected based on at least one factor selected from a group comprising:
a disk page size of at least a first of the one or more computer readable storage media that is different than a disk block size for the first computer readable storage media;
a size of a memory page;
a size of a unit of data used by a file system of at least one of the one or more computer readable storage media; or
a cluster size used by a file system of at least one of the one or more computer readable storage media.

2. The computing device as recited in claim 1, wherein the one or more computer readable storage media include multiple different types of computer readable storage media selected from a group comprising at least:
flash memory,
a hard drive, or
a read-only memory.

3. The computing device as recited in claim 1, wherein a first copy set of the multiple copy sets is stored on the one or more computer readable storage media according to a speed of an area of the one or more computer readable storage media.

4. The computing device as recited in claim 1, wherein at least one grouping of the data units is based, at least in part, on proximity of associated data units to be read.

5. The computing device as recited in claim 1, wherein at least one grouping of the data units is based, at least in part, on read-ahead caching of the one or more computer readable storage media.

6. The computing device as recited in claim 1, wherein at least one of the grouping of the data units is based, at least in part, on providing larger input/outputs of the data units than would occur using a random read.

7. The computing device as recited in claim 1, wherein a first copy set of the multiple copy sets contains the data units organized in an order that is the same as the order in which the data units will be read.

8. A computer-implemented method comprising:
maintaining a master set and multiple copy sets comprising multiple data units on one or more storage devices, each copy set including at least some of the same data units as the master set configured in a different order than the master set;
selecting a copy set to be an active copy set from which input/output accesses are to be satisfied; and
determining whether the input/output accesses to the active copy set are to be buffered prior to being satisfied until a threshold number of input/output accesses have been received or until a threshold amount of time has passed, wherein at least one of the multiple copy sets includes data units whose size is selected based on a disk page size corresponding to at least a first of the one or more storage devices, wherein the disk page size of the first of the one or more storage devices is different than a disk block size of the first of the one or more storage devices.

9. A computer-implemented method as recited in claim 8, the selecting comprising:
monitoring the input/output accesses to the one or more storage devices; and
checking whether one of the multiple copy sets match the monitored input/output accesses.

10. A computer-implemented method as recited in claim 8, wherein the one or more storage devices comprise multiple storage devices of different types selected from a group comprising at least:
- flash memory,
- a hard drive, or
- a read-only memory.

11. A computer-implemented method as recited in claim 8, wherein at least some of the multiple copy sets includes data units whose size is selected based on a size of a memory page.

12. A computer-implemented method as recited in claim 8, wherein at least some of the multiple copy sets includes data units whose size is selected based on a unit of data size used by a file system of at least a first of the one or more storage devices.

13. A computer-implemented method as recited in claim 8, wherein at least some of the multiple copy sets includes data units whose size is selected based on a cluster size used by a file system of at least a first of the one or more storage devices.

14. A computer-implemented method as recited in claim 8, wherein at least some of the multiple copy sets includes one or more data unit sizes designated by a user.

15. A computer-implemented method as recited in claim 8, wherein at least some of the data units are stored according to access speed of the one or more storage devices.

16. A computer-implemented method as recited in claim 8, wherein a first copy set of the multiple copy sets contains at least some of the data units organized to permit sequential reads.

17. A computer-implemented method as recited in claim 8, wherein the master set is stored on a hard-drive and at least one of the multiple copy sets is stored on a flash memory.

18. A computer-implemented method as recited in claim 8, further comprising updating one or more of the multiple copy sets when one or more data units in at least one of the multiple copy sets or in the master set is modified.

19. One or more computer storage media having stored thereon multiple instructions that, when executed by one or more processors, cause the one or more processors to:
   maintain consistency among multiple copy sets of data units stored on one or more storage devices with a master set by detecting when one or more of the multiple copy sets may have been changed, each copy set including at least some of the same data units as the master set and having at least some data units configured in a different order than the master set; and update data units in the multiple copy sets that have been changed in response to said detecting, wherein at least some copy sets comprise a grouping of said data units configured to provide data in response to a particular scenario, wherein the grouping of data units is based, at least in part, on read-ahead caching of the one or more storage devices.

20. One or more computer storage media as recited in claim 19, wherein the one or more storage devices comprise multiple storage devices of different types selected from a group comprising at least:
- flash memory,
- a hard drive, or
- a read-only memory.

21. One or more computer storage media as recited in claim 19, wherein a first copy set of the multiple copy sets contains at least some of the data units organized to permit sequential reads.

22. One or more computer storage media as recited in claim 19, wherein the grouping of data units is based, at least in part, on a proximity of the data units on the one or more storage devices.

23. One or more computer storage media as recited in claim 19, wherein the grouping of data units is based, at least in part, on providing fewer input/outputs operations than would occur using a random read.

* * * * *